(12) United States Patent
McCarthy et al.

(10) Patent No.: US 7,277,020 B2
(45) Date of Patent: Oct. 2, 2007

(54) APPARATUS FOR INDICATING THE STATE OF A CHARACTERISTIC OF A CONSTITUENT IN A CONTAINER

(75) Inventors: Peter Anthony McCarthy, Liscannor (IE); Martin Robert Von Lintzgy, Scariff (IE)

(73) Assignee: Tekelek Patents Limited, Limerick (IE)

( * ) Notice: Subject to any disclaimer, the term of this patent is extended or adjusted under 35 U.S.C. 154(b) by 146 days.

(21) Appl. No.: 11/132,390

(22) Filed: May 19, 2005

(65) Prior Publication Data

US 2006/0261966 A1 Nov. 23, 2006

(51) Int. Cl.
*G08B 21/00* (2006.01)
(52) U.S. Cl. ............... 340/621; 73/1.73; 367/908
(58) Field of Classification Search ............... 340/621, 340/825.69, 825.72, 5.71, 5.72; 73/1.73; 367/908
See application file for complete search history.

(56) References Cited

U.S. PATENT DOCUMENTS

| 4,890,266 A | * | 12/1989 | Woodward | 367/99 |
| 5,131,271 A | * | 7/1992 | Haynes et al. | 73/290 V |
| 6,912,429 B1 | * | 6/2005 | Bilger | 700/19 |
| 2006/0044145 A1 | * | 3/2006 | Akerstrom et al. | 340/612 |

* cited by examiner

*Primary Examiner*—Jeffery Hofsass
*Assistant Examiner*—Hongmin Fan
(74) *Attorney, Agent, or Firm*—Sughrue Mion, PLLC (57) ABSTRACT

Apparatus for indicating the oil level in a central heating oil tank comprises a battery powered monitoring unit (1) for mounting on the oil tank which determines the oil level by an ultrasonic signal transmitter/receiver (18). A first microprocessor (14) in the monitoring unit (1) determines the oil level from the ultrasonic transmitter/receiver (18) and operates a primary transmitter (12) for transmitting a radio signal which includes data indicative of the oil level. A remotely mounted mains electricity powered receiving unit (3) comprises a primary radio receiver (15) for receiving the transmitted signal, and a second microprocessor (16) in the receiving unit (3) controls the operation of a visual display unit (10) for graphically displaying the oil level. The monitoring unit (1) and the receiving unit (3) are operable in a teaching mode initially on power-up of the receiving unit (3) during which the monitoring unit (1) teaches the receiving unit (3) its address. The first microprocessor (14) controls the ultrasonic transmitter for transmitting ultrasonic signals for two predetermined time periods in order to facilitate detection of the oil level as the oil level varies from full to empty.

22 Claims, 3 Drawing Sheets

APPARATUS FOR INDICATING THE STATE OF A CHARACTERISTIC OF A CONSTITUENT IN A CONTAINER

FIELD OF THE INVENTION

The present invention relates to apparatus for indicating the state of a characteristic of a constituent in a container, and in particular, though not limited to apparatus for indicating the level of a constituent, for example, the level of a liquid in a container.

BACKGROUND TO THE INVENTION

Level sensors for determining the level of a liquid in a container, for example, central heating oil in a central heating oil tank, are known. The most basic of such level sensors comprise a sight glass in which the level of the liquid varies in proportion to the level of the liquid in the tank. More sophisticated level sensors include float operated needle gauges in which a float which floats on the surface of the liquid is mechanically linked to a needle gauge. Such level sensors suffer from many disadvantages. For example, the sight glass type sensors are prone to discoloration, thus rendering them substantially opaque and preventing sight of the liquid level, other disadvantages of such sight glass type sensors are that they are prone to leakage and are relatively expensive to fit. The float type devices regularly suffer from mechanical failure and are relatively expensive to produce.

Efforts to provide level sensors which overcome the problems of known sensors have been made, and one such level sensor comprises an ultrasonic sensor which transmits an ultrasonic signal towards the surface of the liquid, and a receiver for receiving an echo of the transmitted signal reflected from the surface of the liquid. Control circuitry, which typically comprises a microprocessor, times the time period between transmission of an ultrasonic signal and reception of the reflected signal, and a determination of the level of the surface of the liquid relative to the ultrasonic sensor is made from the time period between transmission and reception of the ultrasonic signal. However, such ultrasonic level sensors suffer from a disadvantage in that they are prone to providing spurious readings of the level when the tank is relatively full. This is due to the fact that the echo of the transmitted signal reflected from the surface of the liquid may be reflected while the signal is still being transmitted, and thus cannot be detected. In such cases, the ultrasonic level sensor would give an inaccurate reading when the tank is full.

A further disadvantage of the majority of level sensors known heretofore is that the reading of the level of the liquid in the tank is provided on the sensor unit itself, thereby requiring a visit to the tank in order to determine the level of oil in the tank. Attempts to provide apparatus which permits remote monitoring of oil level in a tank have been made. Such apparatus comprise a monitoring unit which is located on the tank for monitoring the oil level in the tank, and a remotely located unit which provides an indication of the oil level in the tank. The remote unit may be located within a house, building or the like. A radio transmitter is located in the monitoring unit for transmitting a signal indicative of the monitored level of the oil in the tank, and a radio receiver located in the remote unit for receiving the transmitted signal. The remote unit in general comprises a visual display unit which displays the oil level. A microprocessor, in general, is provided in the remote unit for decoding the received transmitted signal and for operating the visual display unit for displaying the oil level. However, such apparatus suffer from a number of disadvantages, one in particular of which is that a manufacturer must match the monitoring unit and the remote unit of a pair of such units prior to dispatch, since each pair of units must have a unique address. Otherwise, a signal from any one monitoring unit could be received by the remote unit of other monitoring units. Thus, if a number of closely located houses with central heating oil tanks were provided with such apparatus, there is no guarantee that the reading provided by one remote unit would be the reading from the associated monitoring unit. The requirement of matching such pairs of units imposes considerable additional operation steps in the manufacturing of such units, and additionally, unless a very high level of inspection is operated by a manufacturer, the risk of monitoring and remote units being mixed up is relatively high.

A further disadvantage of such ultrasonic sensing units is that in general, they require an operating voltage of the order of 5 to 10 volts. In general, the monitoring units are battery powered, and in order to provide the voltages required, the batteries, in general, are alkaline batteries, which have a high energy content, and also a high self discharge rate. Such batteries require frequent replacement.

There is therefore a need for apparatus for indicating the level of a liquid or other flowable constituent in a container which overcomes at least some of the above stated problems, and there is also a need for apparatus for indicating the state of a characteristic of a constituent in a container which also overcomes at least some of the above stated problems.

The present invention is directed towards providing such an apparatus.

SUMMARY OF THE INVENTION

According to the invention there is provided apparatus for indicating the state of a characteristic of a constituent in a container, the apparatus comprising:
  a monitoring unit mountable on the container for monitoring the state of the characteristic of the constituent, the monitoring unit comprising:
  a sensor for monitoring the state of the characteristic of the constituent,
  a first microprocessor for reading a signal from the sensor and determining the state of the characteristic from the signal from the sensor, and
  a primary transmitter operable under the control of the first microprocessor for transmitting a signal indicative of the state of the characteristic of the constituent,
  a receiving unit locatable remotely of the monitoring unit for indicating the state of the characteristic of the constituent, the receiving unit comprising:
  a primary receiver for receiving the signal indicative of the state of the characteristic of the constituent transmitted by the monitoring unit, and
  a means for providing a perceptible indication of the state of the characteristic of the constituent in response to the received signal, wherein
  the monitoring unit comprises a teaching means for selectively operating the monitoring unit and the receiving unit in a teaching mode for teaching an address of the receiving unit to the receiving unit.

In one embodiment of the invention the teaching means is responsive to the monitoring unit and the receiving unit being brought into close proximity with each other.

Preferably, a switch means is located in the monitoring unit, and the teaching means is responsive to the switch means being operated from one of an open circuit state and a closed circuit state to the other of the respective states, and advantageously, the switch means in the monitoring unit is a proximity switch, which ideally, is a reed switch, and is responsive to a magnet located in the receiving unit for switching between the open state and the closed state.

Preferably, the receiving unit is operable in the teaching mode for a predetermined time period after being powered up.

Advantageously, the monitoring unit comprises a random number generator for generating the address of the receiving unit when the monitoring unit is in the teaching mode.

In one embodiment of the invention the primary transmitter is operated under the control of the first microprocessor when the monitoring unit is in the teaching mode for transmitting the address of the receiving unit to the receiving unit, and advantageously, the receiving unit comprises a storing means for storing the address of the receiving unit received from the monitoring unit.

In another embodiment of the invention the monitoring unit is adapted for determining the level of a flowable constituent in a container, and the sensor in the monitoring unit comprises a level sensor, and preferably, the level sensor comprises a secondary transmitter for transmitting a monitoring signal towards the surface of the constituent, and a secondary receiver for receiving an echo of the monitoring signal reflected from the surface of the constituent, and for providing the signal to be read by the first microprocessor.

Advantageously, the secondary transmitter is operable under the control of the first microprocessor for transmitting the monitoring signal, and the signal read from the secondary receiver by the first microprocessor is indicative of the reception of an echo of the monitoring signal by the secondary receiver for facilitating the first microprocessor for determining the level of the constituent in the container.

In one embodiment of the invention the secondary transmitter is operable under the control of the first microprocessor for transmitting the monitoring signal for a first predetermined time period, and preferably, the secondary transmitter is operated under the control of the first microprocessor for transmitting the monitoring signal for a second predetermined time period in the absence of a signal from the secondary receiver indicating the reception of an echo of the monitoring signal being received by the secondary receiver after the monitoring signal has been transmitted for the first predetermined time period, the second predetermined time period is longer than the first predetermined time period.

In one embodiment of the invention the duration of the second predetermined time period is at least three times longer than the duration of the first predetermined time period.

In another embodiment of the invention the duration of the second predetermined time period is at least six times longer than the duration of the first predetermined time period.

In a further embodiment of the invention the first predetermined time period is of duration sufficient for the secondary transmitter to transmit approximately three cycles of the monitoring signal.

In one embodiment of the invention the secondary transmitter and the secondary receiver are respectively an ultrasonic transmitter and an ultrasonic receiver.

In another embodiment of the invention the monitoring unit comprises an amplifier for amplifying the echo of the monitoring signal received by the secondary receiver, the amplifier being operable under the control of the first microprocessor at minimum gain sufficient for detecting the echo of the monitoring signal reflected from the surface of the constituent, the amplifier being initially operated under the control of the first microprocessor at maximum gain, and the gain of the amplifier being progressively reduced under the control of the first microprocessor until the gain thereof is at the minimum gain sufficient for detecting the echo of the monitoring signal reflected from the surface of the constituent in the container.

In a further embodiment of the invention the amplifier of the monitoring unit is a variable slicing level detecting amplifier.

In another embodiment of the invention the primary transmitter and the primary receiver are respectively a primary and secondary radio signal transmitter and receiver.

Advantageously, the receiving unit is adapted to be powered by mains electricity, and is integrally formed in a housing having electrical contact pins extending therefrom for engaging a mains electricity power supply socket, a visual display unit for displaying the state of the characteristic being provided in the housing.

ADVANTAGES OF THE INVENTION

The advantages of the invention are many. By virtue of the fact that the monitoring unit and the receiving unit of the apparatus are operable in a teaching mode whereby the monitoring unit can teach the receiving unit its address, the monitoring unit and the receiving unit may be supplied separately of each other without the need for pairing prior to the units being supplied.

A further advantage of the invention is achieved by operating the secondary transmitter to transmit the monitoring signal for two different predetermined time durations. This has the advantage that if the level of the constituent in the container is at a relatively high level, for example, if the container is full to a level corresponding to three quarters or more of a full container, transmitting the monitoring signal for the duration of the first predetermined time period, which is a relatively short time period, is suitable for detecting a relatively high level of the constituent, while the transmission of the monitoring signal for the second predetermined time period, which is of longer duration than the first predetermined time period, is suitable for detecting the level of the constituent in the container when the level of the constituent is at a lower level, typically, below a level corresponding to a three quarters full container. The transmission of the monitoring signal for the first predetermined time period of short duration provides a monitoring signal of sufficient energy to be echoed back to the secondary receiver when the level of the constituent is at the relatively high level, while the transmission of the monitoring signal for the first predetermined time period would have insufficient energy for providing an echo which would be detected by the secondary receiver when the level of the constituent is at a lower level. However, by transmitting the monitoring signal for the second predetermined time period provides a monitoring signal of sufficient energy so that the energy of the echo signal is sufficient for detection by the secondary receiver. Additionally, by transmitting the monitoring signal for the first predetermined time period initially, if the level of the constituent is at a relatively high level, the echo will be received by the secondary receiver unit, thereby permitting the first microprocessor to determine the level of the constituent. If the monitoring signal were transmitted initially for the second predetermined time period, when the level of the constituent was at a relatively high level, many echoes of the transmitted monitoring signal would be received, thereby preventing accurate determination of the level of the constituent in the container.

A further advantage of the invention is achieved by virtue of the fact that the amplifier is operated at minimum gain sufficient for detecting the echo of the monitoring signal, thereby minimising the power requirement of the monitoring unit, which can thus be efficiently battery powered.

The invention will be more clearly understood from the following description of a preferred embodiment thereof, which is given by way of example only, with reference to the accompanying drawings.

DETAILED DESCRIPTION OF A PREFERRED EMBODIMENT OF THE INVENTION

Referring to the drawings, there is illustrated apparatus according to the invention for indicating the state of a characteristic of a constituent, in this embodiment of the invention the level of a liquid, for example, the oil level of central heating oil in a central heating oil tank. The apparatus according to the invention comprises a monitoring unit also according to the invention, indicated generally by the reference numeral 1, see FIG. 1, for monitoring oil level and for transmitting a radio signal indicative of the oil level, and a receiving unit also according to the invention, indicated generally by the reference numeral 3, which is illustrated in FIGS. 2 to 5, for receiving the transmitted signal from the monitoring unit 1 for displaying the oil level as will be described below. The monitoring unit 1 comprises a monitoring unit circuit 4 housed in an enclosed sealed housing 5, which is illustrated in broken lines in FIG. 1. The sealed housing 5 is suitable for sealably mounting in a level sensor receiving port (not shown) of a central heating oil tank (also not shown) for determining the oil level in the central heating oil tank. Such level sensor receiving ports in central heating oil tanks are located on the top of such tanks, and will be well known to those skilled in the art.

The receiving unit 3 comprises a receiving unit circuit 7, which is housed in a receiving unit housing 8. The receiving unit circuit 7 is mains electricity powered as will be described below, and comprises a visual display unit 10 on which the oil level monitored by the monitoring unit 1 is displayed as will also be described below. The receiving unit 3 is locatable remotely of the monitoring unit 1, and typically, is adapted for plugging into a mains electricity socket within a house, the central heating oil tank of which is being monitored by the monitoring unit 1 externally of the house.

Figure 1:
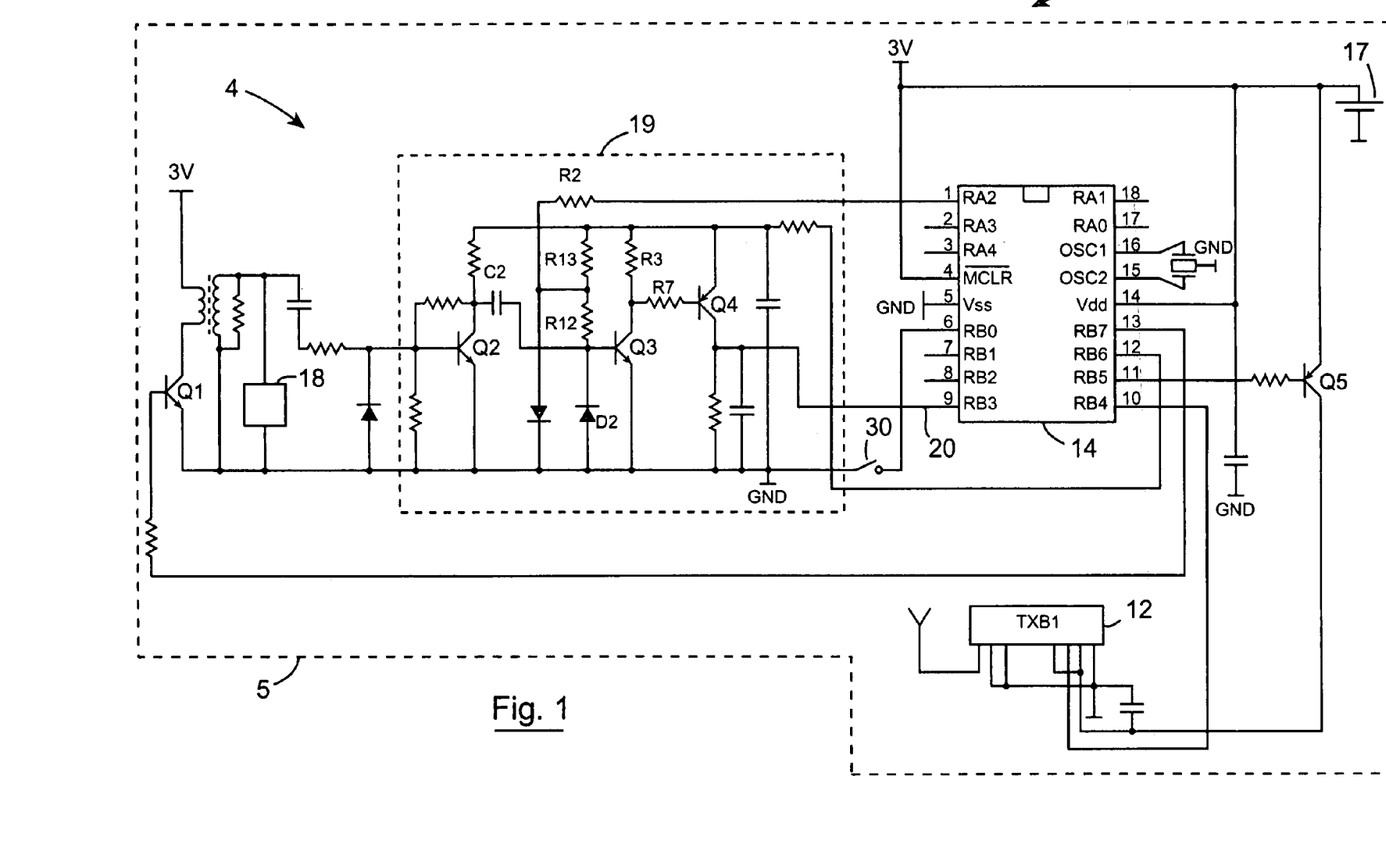
FIG. 1 is a circuit diagram of a monitoring unit according to the invention of apparatus according to the invention for determining the level of liquid in a tank.
Figure 2:
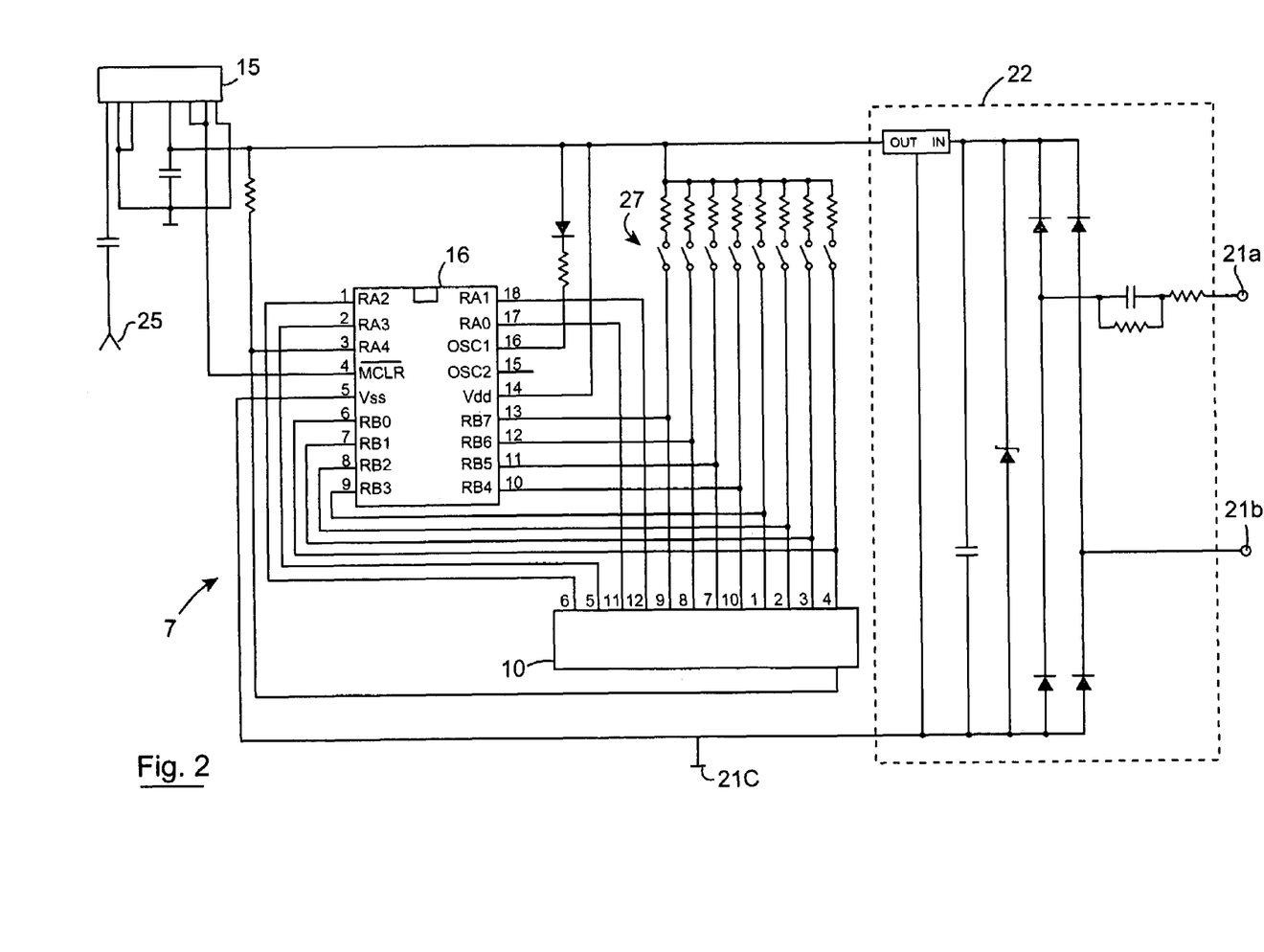
FIG. 2 is a circuit diagram of a receiving unit according to the invention of apparatus according to the invention.
Figure 3:
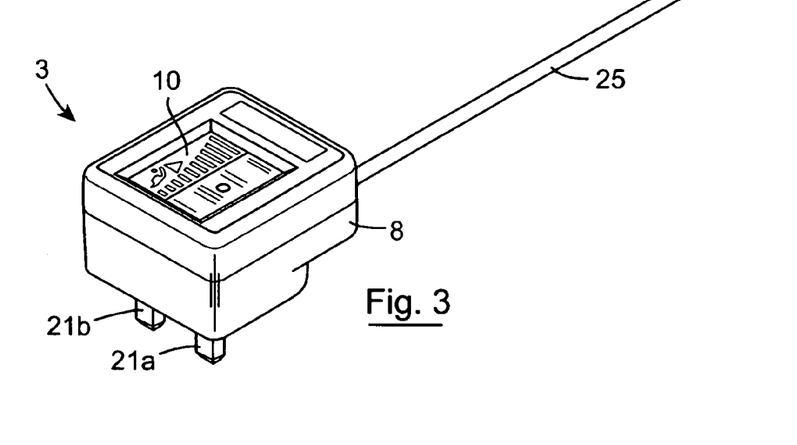
FIG. 3 is a front perspective view of the receiving unit of FIG. 2.

The monitoring unit circuit 4 comprises a primary radio transmitter 12 which is operable under the control of a first microprocessor 14 for transmitting radio frequency signals as will be described below, which are indicative of the oil level in the central heating oil tank. The receiving unit circuit 7 comprises a primary radio receiver 15 which receives the signals transmitted by the primary radio transmitter 12. A second microprocessor 16 in the receiving unit circuit 7 decodes the received transmitted signal, and operates the visual display unit 10 for displaying the oil level in the central heating oil tank.

Turning now in more detail to the monitoring unit circuit 4, the monitoring unit circuit 4 is powered by a 3 volt lithium disc battery 17 of the type commonly referred to as a button cell. A level sensor for monitoring the level of oil in the central heating oil tank in this embodiment of the invention is provided by a secondary transmitter and receiver, namely, an ultrasonic transmitter/receiver 18. The ultrasonic transmitter/receiver 18 is operated under the control of the first microprocessor 14 for transmitting bursts of ultrasonic signals downwardly towards the surface of the oil in the central heating oil tank, and for in turn receiving echoes of bursts of ultrasonic signals reflected from the surface of the oil for determining the oil level. The ultrasonic transmitter/receiver 18 comprises a secondary transmitter (not shown) for transmitting the bursts of the ultrasonic signals and a secondary receiver (also not shown) for receiving echoes of the bursts of the ultrasonic signals. Such ultrasonic transmitter/receivers will be well known to those skilled in the art. A transistor Q1 switches power from the battery 17 to the ultrasonic transmitter/receiver 18 under the control of a signal outputted by the first microprocessor 14 on an output pin RB7. The transistor Q1 is maintained in a conducting state for so long as the signal is maintained on the output pin RB7, and thus the secondary transmitter (not shown) of the ultrasonic transmitter/receiver outputs the burst of ultrasonic signals for so long as the signal remains on the pin RB7 of the first microprocessor 14.

An amplifier circuit 19, which in this embodiment of the invention is a variable slicing level detecting amplifier, receives signals from the secondary receiver (not shown) of the ultrasonic transmitter/receiver 18 in response to the received ultrasonic signals reflected from the surface of the oil for amplifying thereof. The amplifier 19 is a highly non-linear amplifier so that it detects the reflected signals. The operating biasing voltage level of the amplifier is accurately controlled by the first microprocessor 14 in order to optimise detection of the received reflected signals, as will be described below. On detection by the amplifier 19 of a reflected signal, the amplifier 19 outputs a signal on the line 20 to a digital input pin RB3 of the first microprocessor 14. In this embodiment of the invention the line 20 is normally low, and on a reflected signal being detected by the amplifier 19, the amplifier 19 puts a high on the line 20. The first microprocessor 14 on reading a high on the pin RB3 computes the elapsed time from the commencement of transmission of the burst of ultrasonic signals by the ultrasonic transmitter/receiver 18 until the pin RB3 goes high, for in turn determining the level of oil in the central heating oil tank. Knowing the elapsed time between transmission and reception of the burst of ultrasonic signals from the ultrasonic transmitter/receiver 18, the distance of the surface of the oil, namely, the oil level from the ultrasonic transmitter/receiver 18 can be readily determined by the first microprocessor 14. This will be readily apparent to those skilled in the art, and further description should not be required.

The amplifier 19 is a two-stage amplifier, a first stage of which is formed by a transistor Q2, and a second stage of which is formed by transistors Q3 and Q4. A capacitor C2 AC couples the first stage of the amplifier 19 to the second stage. The operating current of the transistors Q3 and Q4 is determined by resistors R12 and R13 and R3 and R7, which act to provide temperature compensation, and also by a current which is outputted by the first microprocessor 14 on a digital-to-analogue pin RA2 via a resistor R2. The transistor Q4 is biased for non-linear operation and also acts as a rectifier. In order to set the biasing voltage level for operation of the amplifier 19 when it is time to make a determination of the oil level in the central heating oil tank the first microprocessor 14 wakes up and sets the digital-to-analogue voltage pin RA2 to its maximum voltage of 2.156 volts. This causes the transistor Q3 to conduct, which in turn causes the transistor Q4 to conduct, thereby putting a high on the line 20 and pulling the pin RB3 of the first microprocessor 14 high. The first microprocessor 14 then progressively reduces the voltage on the digital-to-analogue voltage pin RA2 until the transistor Q4 turns off, which is detected by the first microprocessor 14 by the pin RB3 going low. This, thus, determines the ideal biasing voltage level for the amplifier 19. The first microprocessor 14 maintains the voltage on the digital-to-analogue voltage pin RA2 at this level while the oil level is being determined. With the biasing voltage level so set on the digital-to-analogue voltage pin RA2, the first microprocessor 14 outputs a signal on the pin RB7 for switching on the transistor Q1, for in turn activating the ultrasonic transmitter/receiver 18 for outputting a burst of ultrasonic signals for so long as the signal remains on the pin RB7. On a reflected signal being received by the secondary receiver (not shown) of the ultrasonic transmitter/receiver 18 and being relayed to the amplifier 19, the received signal again switches on the transistor Q4, which in turn pulls the pin RB3 of the first microprocessor 14 high. The first microprocessor 14 thus determines the oil level by computing the elapsed time between the commencement of the burst of ultrasonic signals and the time the pin RB3 goes high, in other words, the elapsed time between the signal being applied to the pin RB7 by the first microprocessor 14 and the pin RB3 going high.

In this embodiment of the invention in order to be able to accurately determine the oil level in the tank should the level be relatively high, for example, when the tank is more than three-quarter full level, the first microprocessor 14 initially outputs the signal on the output pin RB7 for a first predetermined time period, for in turn operating the secondary transmitter (not shown) of the ultrasonic transmitter/receiver 18 for the first predetermined time period. In this embodiment of the invention the first predetermined time period is a short time period of duration corresponding to approximately three cycles of the ultrasonic signal. The first microprocessor 14 reads the input pin RB3 and waits for the pin RB3 to go high. On the input pin RB3 going high, the first microprocessor 14 determines the oil level from the elapsed time.

However, in the event that the oil level in the central heating oil tank is below the three-quarter full level, in general, with a burst of only three cycles of ultrasonic signal, the reflected signal would be too weak to be detected by the amplifier 19, and in which case a signal would not be detected on the input pin RB3. Thus, in the absence of a signal on the pin RB3 the first microprocessor 14 again outputs a signal on the output pin RB7 for a second predetermined time period which is longer than the first predetermined time period, and in this embodiment of the invention is of duration corresponding to approximately eighteen cycles of the ultrasonic signal. Transmitting a burst of ultrasonic signals comprising eighteen cycles of the signal is sufficient for detection of reflected signal from the surface of the oil when the oil level is below the three-quarter full level. On commencement of the signal on the output pin RB7, the first microprocessor 14 again reads the input pin RB3 and awaits the pin going high as a result of a detected reflected signal. The first microprocessor 14 then determines the oil level by computing the elapsed time between the commencement of the signal being applied to the output pin RB7 and the input pin RB3 going high.

The primary radio transmitter 12 is operated under the control of the first microprocessor 14 each time a determination of the oil level has been made by the first microprocessor 14 for transmitting a radio signal indicative of the oil level to the receiving unit 3. The signal to be transmitted by the primary radio transmitter 12 is prepared by the first microprocessor 14, and comprises a 32 bit binary number. The first sixteen bit segment comprises the address of the receiving unit 3. The next eight bits contain control bits and a check sum for confirming that the signal has been correctly received by the receiving unit 3, and the last eight bits are data bits which contain data which is indicative of the oil level in the tank. The purpose of the control bits will be described in more detail below.

Turning now to the receiving unit 3, the receiving unit 3, as mentioned above, is mains electricity powered. Three electrically conductive contact pins 21a, 21b and 21c extend from the receiving unit housing 8 for engaging corresponding contacts of a mains electricity socket, the pin 21c corresponds to an earth pin, while the pins 21a and 21b correspond respectively to live and neutral pins. A power supply circuit 22 provides a regulated 5 volt DC supply from the mains electricity for powering the receiving unit circuit 7. The receiving unit circuit 7 receives the transmitted signal from the primary radio transmitter 12 through the primary radio receiver 15. An aerial 25 extending from the receiving unit housing 8 receives the transmitted signal which is relayed to the primary radio receiver 15 where it is amplified and fed to an analogue input pin RA4 of the second microprocessor 16. The second microprocessor 16 decodes the received signal initially checking the address of the received signal to ensure that the signal is for the receiving unit 3, and then checking the control and check sum, and finally decoding the last eight data bits which are representative of the oil level. The second microprocessor 16 on decoding the last eight bits of the received signal operates the visual display unit 10 for displaying the oil level.

Figures 4, 5:
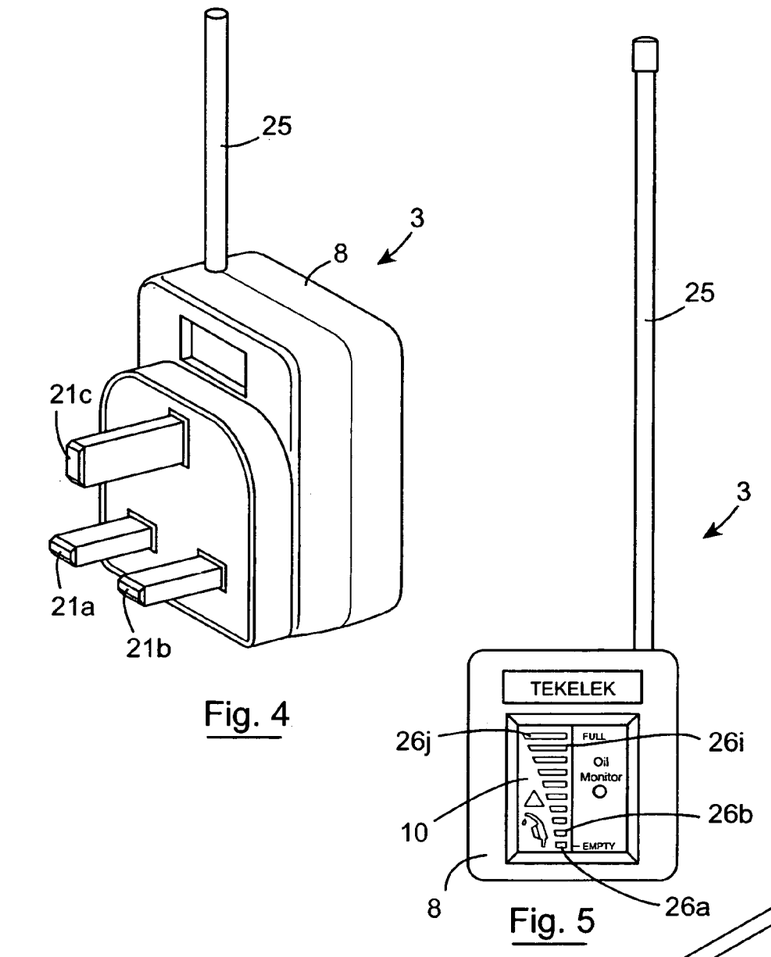
FIG. 4 is a rear perspective view of the receiving unit of FIG. 2.
FIG. 5 is a front elevational view of the receiving unit of FIG. 2.

In this embodiment of the invention the visual display unit 10 comprises ten independently powerable liquid crystal display bars 26a to 26j which are activated to correspond to the oil level in the tank. The lowest bar 26a is activated when the oil level corresponds to the tank being one-tenth full, the two lowest-most bars 26a and 26b are activated when the oil level corresponds to the tank being one-fifth full, and so on up to a full tank being represented by all ten bars 26a to 26j being activated. An eight-pole DIP switch 27 switches on the appropriate number of bars 26a to 26j under the control of the microprocessor 11.

In order that the monitoring unit 1 and the receiving unit 3 can be supplied by a manufacturer without prior pairing, the monitoring unit 1 and the receiving unit 3 are operable in a teaching mode in order that the monitoring unit 1 can teach the receiving unit 3 its address code. The first microprocessor 14 comprises a random number generator for generating a 16 bit binary number to form the address code of the receiving unit 3 when the monitoring unit circuit 1 is operated in the teaching mode. A switch means, in this embodiment of the invention a reed switch 30, switches the monitoring unit 1 between the teaching mode and a normal operating mode whereby the oil level in the oil tank is determined. A magnet (not shown) is located within the receiving unit housing 8, so that when the monitoring unit 1 and the receiving unit 3 are brought into close proximity the action of the magnet on the reed switch 30 operates the reed switch 30 from a normal open circuit state to a closed circuit state, thereby operating the monitoring unit 1 in the teaching mode. On being put into the teaching mode, the first microprocessor 14 generates the 16 bit binary number which is then included in the first sixteen bit segment of a thirty-two bit signal to be transmitted to the receiving unit 3. The next eight bits of the thirty-two bit signal contain a control bit and a check sum. When the monitoring unit 1 is in the teaching mode, the control bit is set to zero to indicate to the receiving unit 3 that the monitoring unit 1 is in the teaching mode, and when the signal is received by the receiving unit 3, the first sixteen bits are to be stored in the second microprocessor 16 as the address of the receiving unit 3. The last eight bits of the 32 bit signal are unused when the monitoring unit 1 is in the teaching mode. Thus, on receipt of the transmitted signal from the monitoring unit 1, the second microprocessor 16 of the receiving unit 3 checks the control bit and on determining that the control bit is zero indicating that the monitoring unit 1 is in the teaching mode, the second microprocessor 16 stores the first sixteen bits of the received signal as its address.

However, in order to avoid the monitoring unit 1 teaching receiving units 3 of other similar apparatus not associated with the monitoring unit 1 which is in the teaching mode, the second microprocessor 16 of the receiving unit 3 is programmed to operate in the teaching mode in response to the control bit of the received signal only during a predetermined teaching time period from power-up of the receiving unit 3. Typically, the time period from power-up during which the receiving unit 3 can operate in the teaching mode is approximately two minutes from power-up. Thereafter, the receiving unit 3 will not operate in the teaching mode irrespective of the state of the control bit in the received signal. If, however, the receiving unit 3 has been powered up for longer than the predetermined two-minute teaching time period, and has not yet been taught its address by the monitoring unit 1, the receiving unit 3 can be powered down by disengaging the receiving unit 3 from the main supply socket and repowering the receiving unit 3 by re-engaging the receiving unit 3 in the mains supply socket, and then initiating teaching by bringing the monitoring unit 1 into close proximity with the receiving unit 3.

In normal operating mode when the signal being transmitted by the monitoring unit 1 to the receiving unit 2 is indicative of the oil level, the control bit is set at 1, thus indicating normal operating mode.

In use, when the receiving unit 3 is initially engaged in a mains electricity supply socket, the monitoring unit 1 is brought into close proximity with the receiving unit 3 for operating the reed switch 30 in the closed circuit state for in turn operating the monitoring unit 1, and in turn the receiving unit 3 in the teaching mode. The first microprocessor 14 generates the 16 bit random number which is then transmitted to the receiving unit 3, and is stored by the second microprocessor 16 as the address of the receiving unit 3. The monitoring unit 1 is then mounted in the level sensor receiving port in the central heating oil tank, and the apparatus is ready to operate in normal mode.

At predetermined intervals, typically, one hour intervals, the first microprocessor 14 wakes up and determines the oil level in the tank, and on determining the oil level, transmits a signal indicative of the oil level as already described for reception by the receiving unit 3. Each time on waking up prior to activating the ultrasonic transmitter/receiver 18, the first microprocessor 14 sets the voltage on the digital-to-analogue voltage pin RA2 at the appropriate level as already described. The first microprocessor 14 then outputs a signal on the output pin RB7 for switching on the transistor Q1 for the first predetermined time period, for in turn activating the ultrasonic transmitter/receiver 18 for outputting a short three-cycle burst of the ultrasonic signal. The first microprocessor 14 reads the input pin RB3 for determining if an echo of the transmitted signal reflected from the surface of the oil has been detected. If a reflected signal is detected, the first microprocessor 14 determines the level of the oil, which is then transmitted by the primary radio transmitter 12 for reception by the primary radio receiver 15 of the receiving unit 3. In the absence of an echo signal being detected on the output line 20, the first microprocessor 14 outputs a signal on the output pin RB7 for switching on the transistor Q1 for the second predetermined time period, for in turn activating the ultrasonic transmitter/receiver 18 for transmitting a long burst of approximately eighteen cycles of the ultrasonic signal. Again the first microprocessor 14 reads the input pin RB3 for determining if an echo of the transmitted signal reflected from the surface of the oil has been detected. The microprocessor 14 then determines the oil level, and operates the primary radio transmitter 12 for transmitting a signal indicative of the oil level for reception by the primary radio receiver 15.

On the primary radio receiver 15 receiving the transmitted signal, the received signal is amplified by the primary radio receiver 15, which in turn feeds the amplified signal to the second microprocessor 16. On the second microprocessor 16 determining that the address of the received signal corresponds to its stored address, the second microprocessor 16 then decodes the last eight data bits of the received signal, which are representative of the oil level, and displays the oil level on the visual display unit 10.

The advantages of the invention are many. Firstly, by virtue of the fact that the monitoring and receiving units can be operated in a teaching mode for teaching the receiving unit an address code generated by the monitoring unit, the monitoring and receiving units can be supplied to an end user without being prior matched. This is a particularly important advantage, since it saves significantly on testing and quality control procedures during manufacture. Secondly, by virtue of the fact that initially a short burst of the ultrasonic signal is outputted by the ultrasonic transmitter/receiver, accurate level sensing of the oil level can be achieved where the oil level in the tank is between three-quarters full and full. Furthermore, should the level of oil in the oil tank be below the three-quarter full level, or be at a level where a reflected signal of the short burst of the ultrasonic signal is not detected, the longer burst of the ultrasonic signal is then outputted by the ultrasonic transmitter/receiver, which detects the reflected signal from the surface of the oil when the oil level is at a lower level in the tank, for example, when the oil level is between three-quarters full and empty. A further advantage of the invention is achieved by the monitoring unit circuit, and in particular, by the provision of the amplifier in the monitoring unit circuit. The arrangement of the amplifier in the monitoring unit circuit minimises the operating voltage required for powering the amplifier, and in turn minimises the voltage and power requirements of the monitoring unit circuit. This, in turn, permits the monitoring unit circuit to be powered by a relatively low voltage battery, for example, by a lithium cell. A further advantage of providing the monitoring unit circuit to be suitable for powering with a lithium cell is that lithium cells have a relatively low self discharge rate, and thus are capable of providing a particularly long service life, thereby minimising the frequency with which battery replacement must be carried out.

While the apparatus has been described for use in determining the oil level of central heating oil in a central heating oil tank, it will be readily apparent to those skilled in the art that the apparatus may be used for determining the level of any liquid or other flowable constituent in a tank or other container. It will also be appreciated that by appropriately selecting the sensor of the monitoring unit the apparatus may be used for monitoring the state of other characteristics of a constituent in a container, for example, for monitoring the temperature of a constituent in a container, the pH, or indeed any other state of any other characteristic of a constituent in a container.

The invention claimed is:

1. Apparatus for indicating the state of a characteristic of a constituent in a container, the apparatus comprising:
   a monitoring unit mountable on the container for monitoring the state of the characteristic of the constituent, the monitoring unit comprising:
      a sensor for monitoring the state of the characteristic of the constituent,
      a first microprocessor for reading a signal from the sensor and determining the state of the characteristic from the signal from the sensor, and
      a primary transmitter operable under the control of the first microprocessor for transmitting a signal indicative of the state of the characteristic of the constituent, and
   a receiving unit locatable remotely of the monitoring unit for indicating the state of the characteristic of the constituent, the receiving unit comprising:
      a primary receiver for receiving the signal indicative of the state of the characteristic of the constituent transmitted by the monitoring unit, and
      a means for providing a perceptible indication of the state of the characteristic of the constituent in response to the received signal,
   wherein the monitoring unit comprises a teaching means for selectively operating the monitoring unit and the receiving unit in a teaching mode for teaching an address of the receiving unit to the receiving unit, and the teaching means is responsive to the monitoring unit and the receiving unit being brought into close proximity with each other for operating the monitoring unit and the receiving unit in the teaching mode.

2. Apparatus as claimed in claim 1 in which a switch means is located in the monitoring unit, and the teaching means is responsive to the switch means being operated from one of an open circuit state and a closed circuit state to the other of the respective states, for operating the monitoring unit and the receiving unit in the teaching mode.

3. Apparatus as claimed in claim 2 in which the switch means in the monitoring unit is a proximity switch.

4. Apparatus as claimed in claim 3 in which the proximity switch is a reed switch, and is responsive to a magnet located in the receiving unit for switching from the one of the open circuit state and the closed circuit state to the other of the respective states.

5. Apparatus as claimed in claim 1 in which the receiving unit is operable in the teaching mode for a predetermined time period after being powered up.

6. Apparatus as claimed in claim 1 in which the monitoring unit comprises a random number generator for generating the address of the receiving unit when the monitoring unit is in the teaching mode.

7. Apparatus as claimed in claim 1 in which the primary transmitter is operated under the control of the first microprocessor when the monitoring unit is in the teaching mode for transmitting the address of the receiving unit to the receiving unit.

8. Apparatus as claimed in claim 1 in which the receiving unit comprises a storing means for storing the address of the receiving unit received from the monitoring unit.

9. Apparatus as claimed in claim 1 in which the monitoring unit is adapted for determining the level of a flowable constituent in a container, and the sensor in the monitoring unit comprises a level sensor.

10. Apparatus as claimed in claim 9 in which the level sensor comprises a secondary transmitter for transmitting a monitoring signal towards the surface of the constituent, and a secondary receiver for receiving an echo of the monitoring signal reflected from the surface of the constituent, and for providing the signal to be read by the first microprocessor.

11. Apparatus as claimed in claim 10 in which the secondary transmitter is operable under the control of the first microprocessor for transmitting the monitoring signal, and the signal read from the secondary receiver by the first microprocessor is indicative of the reception of an echo of the monitoring signal by the secondary receiver for facilitating the first microprocessor for determining the level of the constituent in the container.

12. Apparatus as claimed in claim 10 in which the secondary transmitter is operable under the control of the first microprocessor for transmitting the monitoring signal for a first predetermined time period.

13. Apparatus as claimed in claim 12 in which the secondary transmitter is operated under the control of the first microprocessor for transmitting the monitoring signal for a second predetermined time period in the absence of a signal from the secondary receiver indicating the reception of an echo of the monitoring signal being received by the secondary receiver after the monitoring signal has been transmitted for the first predetermined time period, the second predetermined time period is longer than the first predetermined time period.

14. Apparatus as claimed in claim 13 in which the duration of the second predetermined time period is at least three times longer than the duration of the first predetermined time period.

15. Apparatus as claimed in claim 14 in which the duration of the second predetermined time period is at least six times longer than the duration of the first predetermined time period.

16. Apparatus as claimed in claim 12 in which the first predetermined time period is of duration sufficient for the secondary transmitter to transmit approximately three cycles of the monitoring signal.

17. Apparatus as claimed in claim 10 in which the secondary transmitter and the secondary receiver are respectively an ultrasonic transmitter and an ultrasonic receiver.

18. Apparatus as claimed in claim 11 in which the monitoring unit comprises an amplifier for amplifying the echo of the monitoring signal received by the secondary receiver, the amplifier being operable under the control of the first microprocessor at minimum gain sufficient for detecting the echo of the monitoring signal reflected from the surface of the constituent, the amplifier being initially operated under the control of the first microprocessor at maximum gain, and the gain of the amplifier being progressively reduced under the control of the first microprocessor until the gain thereof is at the minimum gain sufficient for detecting the echo of the monitoring signal reflected from the surface of the constituent in the container.

19. Apparatus as claimed in claim 18 in which the amplifier of the monitoring unit is a variable slicing level detecting amplifier.

20. Apparatus as claimed in claim 1 in which the primary transmitter and the primary receiver are respectively a primary and secondary radio signal transmitter and receiver.

21. Apparatus as claimed in claim 1 in which the receiving unit is adapted to be powered by mains electricity, and is integrally formed in a housing having electrical contact pins extending therefrom for engaging a mains electricity power supply socket, a visual display unit for displaying the state of the characteristic being provided in the housing.

22. Apparatus for indicating the state of a characteristic of a constituent in a container, the apparatus comprising:
  a monitoring unit mountable on the container for monitoring the state of the characteristic of the constituent, the monitoring unit comprising:
    a sensor for monitoring the state of the characteristic of the constituent,
    a first microprocessor for reading a signal from the sensor and determining the state of the characteristic from the signal from the sensor, and
    a primary transmitter operable under the control of the first microprocessor for transmitting a signal indicative of the state of the characteristic of the constituent, and
  a receiving unit locatable remotely of the monitoring unit for indicating the state of the characteristic of the constituent, the receiving unit comprising:
    a primary receiver for receiving the signal indicative of the state of the characteristic of the constituent transmitted by the monitoring unit,
    a means for providing a perceptible indication of the state of the characteristic of the constituent in response to the received signal, and
    a magnet,
  wherein the monitoring unit comprises a reed switch and a teaching means for selectively operating the monitoring unit and the receiving unit in a teaching mode for teaching an address of the receiving unit to the receiving unit, and the teaching means is responsive to the reed switch being operated by the magnet of the receiving means from one of an open circuit state and a closed circuit state to the other of the respective states for operating the monitoring unit and the receiving unit in the teaching mode.

\* \* \* \* \*